United States Patent
Baba et al.

(10) Patent No.: US 12,350,653 B2
(45) Date of Patent: Jul. 8, 2025

(54) EXHAUST GAS PURIFICATION CATALYST

(71) Applicant: MITSUI MINING & SMELTING CO., LTD., Tokyo (JP)

(72) Inventors: Takashi Baba, Saitama (JP); Akihiro Isayama, Saitama (JP)

(73) Assignee: MITSUI MINING & SMELTING CO., LTD., Tokyo (JP)

(*) Notice: Subject to any disclaimer, the term of this patent is extended or adjusted under 35 U.S.C. 154(b) by 214 days.

(21) Appl. No.: 17/780,622

(22) PCT Filed: Nov. 27, 2020

(86) PCT No.: PCT/JP2020/044289
§ 371 (c)(1),
(2) Date: May 27, 2022

(87) PCT Pub. No.: WO2021/107120
PCT Pub. Date: Jun. 3, 2021

(65) Prior Publication Data
US 2023/0001391 A1    Jan. 5, 2023

(30) Foreign Application Priority Data
Nov. 29, 2019   (JP) ................... 2019-217299

(51) Int. Cl.
*B01J 27/18* (2006.01)
*B01D 53/94* (2006.01)
(Continued)

(52) U.S. Cl.
CPC ...... *B01J 27/1804* (2013.01); *B01D 53/9422* (2013.01); *B01D 53/945* (2013.01);
(Continued)

(58) Field of Classification Search
CPC .......... F01N 3/101; F01N 3/021; F01N 3/035; F01N 2330/06; F01N 2330/34;
(Continued)

(56) References Cited

U.S. PATENT DOCUMENTS

| | | |
|---|---|---|
| 7,159,390 B2 | 1/2007 | Saito et al. |
| 8,066,963 B2 | 11/2011 | Klingmann et al. |

(Continued)

FOREIGN PATENT DOCUMENTS

| | | | |
|---|---|---|---|
| CN | 106732583 A | 5/2017 | |
| GB | 2027358 A * | 2/1980 | ........... B01D 53/945 |

(Continued)

OTHER PUBLICATIONS

PCT International Preliminary Report on Patentability and Written Opinion of the International Searching Authority dated Feb. 2, 2021 filed in PCT/JP2020/044289.

(Continued)

*Primary Examiner* — Coris Fung
*Assistant Examiner* — Keling Zhang
(74) *Attorney, Agent, or Firm* — RANKIN, HILL & CLARK LLP (57) ABSTRACT

An object of the present invention is to provide an exhaust gas purification catalyst having improved exhaust gas (e.g., NOx) purifying performance at low to medium temperature. In order to achieve the object, the present invention provides an exhaust gas purification catalyst including: a substrate; and a catalyst layer formed on the substrate, wherein the catalyst layer contains rhodium element, phosphorus element and a rare earth element other than cerium element, wherein a ratio of a mass of the phosphorus element contained in the catalyst layer to the mass of the rhodium element contained in the catalyst layer is from 1 to 10, and wherein a ratio of a mass of the rare earth element other than (Continued)

cerium element in terms of an oxide thereof contained in the catalyst layer to the mass of the rhodium element contained in the catalyst layer is from 1 to 5.

8 Claims, 4 Drawing Sheets

(51) Int. Cl.
  *B01J 27/185* (2006.01)
  *F01N 3/10* (2006.01)
(52) U.S. Cl.
  CPC ......... *B01J 27/1856* (2013.01); *F01N 3/101* (2013.01); *B01D 2255/1025* (2013.01); *B01D 2255/206* (2013.01); *B01D 2257/40* (2013.01); *B01D 2257/502* (2013.01); *B01D 2257/702* (2013.01); *B01D 2258/01* (2013.01); *B01J 2523/37* (2013.01); *B01J 2523/51* (2013.01); *B01J 2523/822* (2013.01)
(58) Field of Classification Search
  CPC ............. F01N 2370/02; F01N 2570/16; F01N 2510/0682; B01J 23/63; B01J 27/1804; B01J 27/1856; B01J 37/0018; B01J 37/0236; B01J 37/0248; B01J 37/28; B01J 2523/37; B01J 2523/51; B01J 2523/822; B01D 53/945; B01D 53/9422; B01D 2255/1025; B01D 2255/206; B01D 2255/2068; B01D 2255/407; B01D 2255/707; B01D 2255/908; B01D 2255/9155; B01D 2258/01; B01D 2258/014; B01D 2257/40; B01D 2257/502; B01D 2257/702
  USPC .................................................. 502/208, 213
  See application file for complete search history.

(56) References Cited

U.S. PATENT DOCUMENTS

| | | |
|---|---|---|
| 9,080,484 B2 | 7/2015 | Miyairi |
| 10,159,935 B2 | 12/2018 | Onoe et al. |
| 10,357,744 B2 | 7/2019 | Ohashi et al. |
| 10,981,113 B2 | 4/2021 | Onoe et al. |
| 11,280,237 B2 | 3/2022 | Yoshioka et al. |
| 2009/0087365 A1 | 4/2009 | Klingmann et al. |
| 2014/0208946 A1* | 7/2014 | He .................... B01D 46/2476 55/523 |
| 2017/0296969 A1 | 10/2017 | Ohashi et al. |

FOREIGN PATENT DOCUMENTS

| | | |
|---|---|---|
| JP | 2009-82915 A | 4/2009 |
| JP | 2016-78016 A | 5/2016 |
| WO | 2019/087132 A1 | 5/2019 |

OTHER PUBLICATIONS

Extended European Search Report (EESR) dated Jan. 2, 2023 for European Patent Application No. 20893000.8.

\* cited by examiner

EXHAUST GAS PURIFICATION CATALYST

CROSS-REFERENCE TO RELATED APPLICATIONS

This application is a National Phase Application of International Application No. PCT/JP2020/044289, filed Nov. 27, 2020, which claims the priority of Japan Patent Application No. 2019-217299, filed Nov. 29, 2019. The present application claims priority from both applications and each of these applications is herein incorporated in their entirety by reference.

BACKGROUND OF THE INVENTION

Field of the Invention

The present invention relates to an exhaust gas purification catalyst.

Background Art

Exhaust gas discharged from an internal combustion engine of an automobile, a motorcycle or the like contains harmful components such as hydrocarbons (HC), carbon monoxide (CO) and nitrogen oxide (NOx). A three-way catalyst is used to purify and detoxify those harmful components. Noble metal catalysts such as platinum (Pt), palladium (Pd) and rhodium (Rh) are used as a three-way catalyst. Pt and Pd are mainly involved in oxidative purification of HC and CO and Rh is mainly involved in reductive purification of NOx.

It is desirable that an air-fuel ratio A/F during supply to an internal combustion engine be controlled to be near a theoretical air-fuel ratio (stoichiometry). However, since an actual air-fuel ratio swings, with a stoichiometry at a center, to a rich side (fuel-rich atmosphere) or a lean side (fuel-lean atmosphere), depending on driving conditions of a motor vehicle or the like, an air-fuel ratio of exhaust gas similarly swings to a rich or lean side. Due to this, to decrease a change in an oxygen concentration in exhaust gas and improve an exhaust gas purifying performance of a catalyst, a material having an ability to absorb oxygen when the oxygen concentration in the exhaust gas is high and release oxygen when the oxygen concentration in the exhaust gas is low (i.e., oxygen storage capacity (OSC)) (hereinafter, may be referred to as "OSC material"), for example, a $CeO_2$—$ZrO_2$-based complex oxide, is used.

In addition to harmful components such as HC, CO and NOx, exhaust gas contains particulate matter (PM), which is known as causing air pollution. For example, a gasoline direct injection engine (GDI), which is used in a vehicle equipped with a gasoline engine, is fuel-efficient and high-power, but is known to discharge a larger amount of PM in exhaust gas than a conventional gasoline port injection engine. To respond to an environmental regulation on PM, a vehicle equipped with a gasoline engine such as GDI is also required to be installed with a filter with a PM collecting function (GPF: Gasoline Particulate Filter) as in a vehicle equipped with a diesel engine.

For example, a substrate having a structure called a wall-flow structure is used as a GPF. In the wall-flow substrate, when exhaust gas flows in from a cell inlet, passes through a porous partition wall dividing cells, and flows out from a cell outlet, PM in the exhaust gas is collected in a pore inside the partition wall.

Since space for installing an exhaust gas purification catalyst is usually limited, technologies for collecting PM and purifying harmful components such as HC, CO and NOx by supporting a noble metal catalyst such as Pt, Pd and Rh on a GPF have been studies.

For example, Patent Document 1 discloses an exhaust gas purification catalyst including a palladium-containing layer and a rhodium-containing layer, wherein the palladium-containing layer and the rhodium-containing layer are stacked so that one of the palladium-containing layer and the rhodium-containing layer is positioned inside a partition wall, while the other is positioned on a surface of the partition wall.

Patent Document 2 discloses an exhaust gas purification catalyst including: an inflow-side cell, wherein only an end on an exhaust gas inflow side is open; an outflow-side cell adjacent to the inflow-side cell, wherein only an end on an exhaust gas outflow side is open; a wall-flow substrate having a porous partition wall that separates the inflow-side cell and the outflow-side cell from each other; an upstream catalyst layer provided inside the partition wall; and a downstream catalyst layer provided inside the partition wall, wherein each of the upstream and downstream catalyst layers contains a carrier and at least one noble metal selected from platinum (Pt), palladium (Pd) and rhodium (Rh) supported on the carrier, and wherein the noble metal contained in the upstream catalyst layer is different from the noble metal contained in the downstream catalyst layer.

PRIOR ART REFERENCES

Patent Documents

[Patent Document 1] JP 2009-82915 A
[Patent Document 2] JP 2016-78016 A

SUMMARY OF THE INVENTION

Problems to be Solved by the Invention

However, a conventional exhaust gas purification catalyst is insufficient in exhaust gas purifying performance (in particular, NOx purifying performance) at low to medium temperature.

Accordingly, an object of the present invention is to provide an exhaust gas purification catalyst having improved exhaust gas purifying performance (in particular, improved NOx purifying performance) at low to medium temperature.

Solutions to the Problems

To achieve the object, the present invention provides an exhaust gas purification catalyst, including:
a substrate; and
a catalyst layer formed on the substrate,
  wherein the catalyst layer contains rhodium element, phosphorus element and a rare earth element other than cerium element,
  wherein a ratio of a mass of the phosphorus element contained in the catalyst layer to a mass of the rhodium element contained in the catalyst layer is from 1.0 to 10, and
  wherein a ratio of a mass of the rare earth element other than cerium element in terms of an oxide thereof contained in the catalyst layer to the mass of the rhodium element contained in the catalyst layer is from 1.0 to 5.0.

Effect of the Invention

According to the present invention, an exhaust gas purification catalyst having improved exhaust gas purifying performance (in particular, improved NOx purifying performance) at low to medium temperature is provided.

DETAILED DESCRIPTION OF THE INVENTION

The exhaust gas purification catalyst according to the present invention will be described below.

The exhaust gas purification catalyst according to the present invention includes a substrate and a catalyst layer according to the present invention formed on the substrate.

The substrate can be selected as appropriate from substrates of conventional exhaust gas purification catalysts. Examples of the substrate include a wall-flow substrate and a flow-through substrate.

The material constituting the substrate can be selected as appropriate from substrate materials of conventional exhaust gas purification catalysts. Preferably, the material constituting the substrate is a material that allows the substrate to stably maintain its shape even when the substrate is exposed to high-temperature (e.g., 400° C. or higher) exhaust gas. Examples of the material of the substrate include: ceramics such as cordierite, silicon carbide (SiC) and aluminum titanate; and alloys such as stainless steel.

The amount of the catalyst layer according to the present invention formed on the substrate can be appropriately adjusted in consideration of, for example, the balance between the exhaust gas purifying performance and the cost.

The catalyst layer according to the present invention contains rhodium (Rh) element, phosphorus (P) element and a rare earth element other than cerium (Ce) element. The ratio of the mass of the phosphorus element contained in the catalyst layer according to the present invention to the mass of the rhodium element contained in the catalyst layer according to the present invention is from 1.0 to 10, and the ratio of the mass of the rare earth element other than cerium element in terms of an oxide thereof contained in the catalyst layer according to the present invention to the mass of the rhodium element contained in the catalyst layer according to the present invention is from 1.0 to 5.0. These enable the exhaust gas purification catalyst according to the present invention to exhibit excellent exhaust gas purifying performance (in particular, excellent NOx purifying performance) at low to medium temperature. The exhaust gas purifying performance at low to medium temperature can be evaluated based on the light-off temperature T50. The light-off temperature T50 is a temperature at which the purification efficacy reaches 50%, and can be measured according to the conditions described in the Examples herein. As used herein, the term "low to medium temperature" means a temperature of from 200° C. to 400° C.

The catalyst layer according to the present invention contains rhodium element. The rhodium element is a catalytic active component mainly involved in reductive purification of NOx. The rhodium element is contained in the catalyst layer according to the present invention, in a form that can function as a catalytic active component, for example, in a form of a rhodium metal or a compound containing rhodium element (e.g., an oxide of rhodium element). Preferably, the catalytic active component is in a form of particles, from the viewpoint of improving exhaust gas purifying performance.

The catalyst layer according to the present invention may contain a catalytic active component other than rhodium element. For example, the catalytic active component other than rhodium element can be selected from noble metal elements such as platinum (Pt) element, palladium (Pd) element, ruthenium (Ru) element, iridium (Ir) element and osmium (Os) element. A noble metal element is contained in the catalyst layer according to the present invention, in a form that can function as a catalytic active component, for example, in a form of a noble metal or a compound containing a noble metal element (e.g., an oxide of a noble metal element). Preferably, the catalytic active component is in a form of particles, from the viewpoint of improving exhaust gas purifying performance. In this regard, when the catalyst layer according to the present invention contains rhodium element and a noble metal element other than rhodium element, the rhodium element and the noble metal element other than rhodium element may form an alloy, resulting in a decrease in active sites provided by the rhodium element, which are involved in reductive purification of NOx. Furthermore, when the catalyst layer according to the present invention contains rhodium element and a noble metal element other than rhodium element, the phosphorus element contained in the catalyst layer according to the present invention may cause poisoning of the noble metal element other than rhodium element (for example, of palladium element or platinum element). Therefore, it is preferable that the catalyst layer according to the present invention does not contain any noble metal element other than rhodium element.

The amount of the rhodium element contained in the catalyst layer according to the present invention can be appropriately adjusted in consideration of, for example, the balance between the exhaust gas purifying performance and the cost. From the viewpoint of the balance between the exhaust gas purifying performance and the cost, and the like, the mass of the rhodium element contained in the catalyst layer according to the present invention is preferably from 0.10 g/L to 1.2 g/L, more preferably from 0.30 g/L to 1.1 g/L, still more preferably from 0.40 g/L to 1.1 g/L, and still more preferably from 0.50 g/L to 1.1 g/L, based on a unit volume of the substrate. As used herein, the term "volume of the substrate" means the apparent volume of the substrate. For example, when the substrate is cylindrical with an outer diameter of 2r, the volume of the substrate is represented by the following equation:

$$\text{the volume of the substrate} = \pi \times r^2 \times (\text{the length of the substrate}).$$

The catalyst layer according to the present invention contains phosphorus element. The phosphorus element is a component for improving exhaust gas purifying performance (in particular, NOx purifying performance) at low to medium temperature in the exhaust gas purification catalyst according to the present invention. The phosphorus element is contained in the catalyst layer according to the present invention, for example, in an oxide form. The oxide of phosphorus element may form a complex oxide together with an oxide of another element. Examples of the oxide of the other element include $CeO_2$ and/or $ZrO_2$ contained in an oxygen storage component. The oxygen storage component will be described later.

The amount of the phosphorus element contained in the catalyst layer according to the present invention is not particularly limited as long as the ratio of the mass of the phosphorus element contained in the catalyst layer according to the present invention to the mass of the rhodium element contained in the catalyst layer according to the present invention is from 1.0 to 10. From the viewpoint of further improving exhaust gas purifying performance (in particular, NOx purifying performance) at low to medium temperature, the ratio of the mass of the phosphorus element contained in the catalyst layer according to the present invention to the mass of the rhodium element contained in the catalyst layer according to the present invention is preferably from 2.0 to 8.0, more preferably from 2.5 to 7.5, still more preferably from 3.0 to 7.0, still more preferably from 3.0 to 6.0, still more preferably from 3.0 to 5.0, and still more preferably from 3.0 to 4.5.

The ratio of the mass of the phosphorus element contained in the catalyst layer according to the present invention to the mass of the rhodium element contained in the catalyst layer according to the present invention can be determined according to the following method.

The exhaust gas purification catalyst according to the present invention is cut by a plane perpendicular to the axis direction (the exhaust gas flow direction X) of the substrate to prepare a cut piece C1 that contains a part of the catalyst layer according to the present invention but does not contain any other catalyst layer than the catalyst layer according to the present invention. The cut piece C1 has a determined size. For example, the cut piece C1 is cylindrical with a diameter of 25.4 mm and a length of 30 mm. The length of the catalyst layer according to the present invention contained in the cut piece C1 is equal to the length of the cut piece C1 (the length of the cut piece C1 in the axis direction (the exhaust gas flow direction X)). That is, the catalyst layer according to the present invention extends in the axis direction (the exhaust gas flow direction X) of the cut piece C1 from one end of the cut piece C1 to the other end of the cut piece C1.

Using a conventional method such as inductively coupled plasma atomic emission spectroscopy (ICP-AES), the masses of the rhodium element and the phosphorus element contained in the cut piece C1 are measured, from which the masses of the rhodium element and the phosphorus element per unit volume of the cut piece C1 are calculated according to the following equations. The term "volume of the cut piece C1" means the apparent volume of the cut piece C1. For example, when the cut piece C1 is cylindrical with an outer diameter of 2r, the volume of the cut piece C1 is represented by the following equation:

the volume of the cut piece $C1 = \pi \times r^2 \times$(the length of the cut piece $C1$).

the mass of the rhodium element per unit volume of the cut piece $C1$=the mass of the rhodium element contained in the cut piece $C1$/the volume of the cut piece $C1$ the mass of the phosphorus element per unit volume of the cut piece $C1$=the mass of the phosphorus element contained in the cut piece $C1$/the volume of the cut piece $C1$ Using five cut pieces C1, the mass of the rhodium element per unit volume of each of the cut pieces C1 is determined, and the average value Vr is calculated from them.

Using five cut pieces C1, the mass of the phosphorus element per unit volume of each of the cut pieces C1 is determined, and the average value Vp is calculated from them.

The ratio of the mass of the phosphorus element contained in the catalyst layer according to the present invention to the mass of the rhodium element contained in the catalyst layer according to the present invention is calculated according to the following equation.

the ratio of the mass of the phosphorus element contained in the catalyst layer according to the present invention to the mass of the rhodium element contained in the catalyst layer according to the present invention=the average value $Vp$/the average value $Vr$ The catalyst layer according to the present invention contains a rare earth element other than cerium element. The rare earth element other than cerium element is a component for improving exhaust gas purifying performance (in particular, NOx purifying performance) at low to medium temperature in the exhaust gas purification catalyst according to the present invention. The rare earth element other than cerium element is contained in the catalyst layer according to the present invention, for example, in an oxide form. The oxide of the rare earth element other than cerium element may form a complex oxide together with an oxide of another element. Examples of the oxide of the other element include $CeO_2$ and/or $ZrO_2$ contained in an oxygen storage component. The oxygen storage component will be described later.

The rare earth element other than cerium element can be selected from yttrium (Y) element, praseodymium (Pr) element, scandium (Sc) element, lanthanum (La) element, neodymium (Nd) element, samarium (Sm) element, europium (Eu) element, gadolinium (Gd) element, terbium (Tb) element, dysprosium (Dy) element, holmium (Ho) element, erbium (Er) element, thulium (Tm) element, ytterbium (Yb) element, lutetium (Lu) element, and the like. From the viewpoint of further improving exhaust gas purifying performance (in particular, NOx purifying performance) at low to medium temperature, the rare earth element other than cerium element is preferably selected from lanthanum element, neodymium element, yttrium element, and the like, more preferably from neodymium element, yttrium element, and the like. The oxide of a rare earth element other than praseodymium element and terbium element is sesquioxide ($Re_2O_3$, Re represents a rare earth element). Praseodymium oxide is usually $Pr_6O_{11}$, and terbium oxide is usually $Tb_4O_7$.

The catalyst layer according to the present invention may contain one rare earth element other than cerium element, or may contain two or more rare earth elements other than cerium element. When the catalyst layer according to the present invention contains two or more rare earth elements other than cerium element, the phrase "the mass of the rare earth element other than cerium element in terms of an oxide thereof contained in the catalyst layer according to the present invention" means the total mass of the two or more rare earth elements other than cerium element in terms of oxides thereof.

The amount of the rare earth element other than cerium element contained in the catalyst layer according to the present invention is not particularly limited as long as the ratio of the mass of the rare earth element other than cerium element in terms of an oxide thereof contained in the catalyst layer according to the present invention to the mass of the rhodium element contained in the catalyst layer according to the present invention is from 1.0 to 5.0. From the viewpoint of further improving exhaust gas purifying performance (in particular, NOx purifying performance) at low to medium temperature, the ratio of the mass of the rare earth element other than cerium element in terms of an oxide thereof contained in the catalyst layer according to the present invention to the mass of the rhodium element contained in the catalyst layer according to the present invention is preferably from 1.5 to 4.5, more preferably from 2.0 to 4.0, and still more preferably from 2.5 to 3.5.

The ratio of the mass of the rare earth element other than cerium element in terms of an oxide thereof contained in the catalyst layer according to the present invention to the mass of the rhodium element contained in the catalyst layer according to the present invention can be determined in the same manner as the ratio of the mass of the phosphorus element contained in the catalyst layer according to the present invention to the mass of the rhodium element contained in the catalyst layer according to the present invention. The mass of the rare earth element other than cerium element in terms of an oxide thereof can be calculated from the mass of the rare earth element other than cerium element.

From the viewpoint of further improving exhaust gas purifying performance (in particular, NOx purifying performance) at low to medium temperature, the ratio of the mass of the rare earth element other than cerium element in terms of an oxide thereof contained in the catalyst layer according to the present invention to the mass of the phosphorus element contained in the catalyst layer according to the present invention is preferably from 0.50 to 5.0, more preferably from 1.0 to 4.5, still more preferably from 1.0 to 4.0, still more preferably from 1.0 to 3.5, more preferably from 1.0 to 3.0, and still more preferably from 1.0 to 2.5.

From the viewpoint of further improving exhaust gas purifying performance (in particular, NOx purifying performance) at low to medium temperature, it is preferable that the catalyst layer according to the present invention contains inorganic oxide particles, and that the rhodium element, the phosphorus element and the rare earth element other than cerium element are supported on the inorganic oxide particles.

Preferably, the inorganic oxide particles are each a porous body because of their easy loading of the rhodium element, the phosphorus element and the rare earth element other than cerium element. The BET specific surface area of the porous body is, for example, from 50 to 150 $m^2/g$. The BET specific surface area can be measured according to JIS R1626: 1996, "Measuring methods for the specific surface area of fine ceramic powders by gas adsorption using the BET method," "6.2 Flow method," "(3.5) Single-point method." In this method, a nitrogen-helium mixture containing 30% by volume of nitrogen as an adsorbent gas and 70% by volume of helium as a carrier gas is used as a gas. "BEL-SORP-MR6" manufactured by MicrotracBEL Corp. is used as a measurement device.

The inorganic oxide constituting the inorganic oxide particle may or may not have an oxygen storage capacity. In the present specification, an inorganic oxide having an oxygen storage capacity may be referred to as an oxygen storage component or an OSC material. The catalyst layer according to the present invention preferably contains an oxygen storage component, and more preferably contains an oxygen storage component and an inorganic oxide other than the oxygen storage component, from the viewpoint of allowing the catalyst layer to exhibit exhaust gas purifying performance efficiently and stably against changes in air-fuel ratio.

The phrase "the rhodium element, the phosphorus element and the rare earth element other than cerium element are supported on inorganic oxide particles" means that the rhodium element, the phosphorus element and the rare earth element other than cerium element are physically or chemically adsorbed or retained on the outer surfaces, or on the inner surfaces of pores, of the inorganic oxide particles. For example, the rhodium element, phosphorus element and the rare earth element other than cerium element can be determined to be supported on the inorganic oxide particles, when the existence regions of the rhodium element, the phosphorus element and the rare earth element other than cerium element each overlap with the existence regions of the inorganic oxide particles in the element mapping obtained by analyzing a cross section of the catalyst layer according to the present invention by EDS (energy dispersive spectroscopy). The existence regions of the rhodium element, the phosphorus element and the rare earth element other than cerium element may be or may not be overlapped with one other. In other words, it is required that the rhodium element, the phosphorus element and the rare earth element other than cerium element are each independently supported on one or more of the inorganic oxide particles, but it is not required that all of the rhodium element, the phosphorus element and the rare earth element other than cerium element are supported on the same inorganic oxide particles. Of course, two or more of the rhodium element, the phosphorus element and the rare earth element other than cerium element may be supported on the same inorganic oxide particles.

The average particle size of one particle (e.g., catalytic active component) supported on another particle (e.g., inorganic oxide particle) is preferably 10% or less, more preferably 3% or less, and still more preferably 1% or less, relative to the average particle size of the other particle. Here, the average particle size refers to the average value of the Feret diameters of 30 or more particles as observed by SEM.

The oxygen storage component is, for example, a metal oxide in which the valence of the constituting element changes under the operating conditions of the exhaust gas purification catalyst. Examples of the oxygen storage component include a metal oxide containing cerium (Ce) element. Examples of the metal oxide containing cerium element include cerium oxide ($CeO_2$), and a complex oxide containing cerium (Ce) element and zirconium (Zr) element (hereinafter, referred to as "$CeO_2$—$ZrO_2$-based complex oxide"). Among these, the $CeO_2$—$ZrO_2$-based complex oxide is preferable. In the $CeO_2$—$ZrO_2$-based complex oxide, $Ce_2O$ and $ZrO_2$ preferably form a solid solution phase. In the $CeO_2$—$ZrO_2$-based complex oxide, $Ce_2O$ and $ZrO_2$ may each form a single phase (a $Ce_2O$ single phase or a $ZrO_2$ single phase) in addition to the solid solution phase. The formation of a solid solution phase by $CeO_2$ and $ZrO_2$ can be confirmed by detecting the formation of a single phase derived from $CeO_2$—$ZrO_2$ using an X-ray diffractometer (XRD).

The phosphorus element or an oxide thereof contained in the catalyst layer according to the present invention may form a complex oxide together with $Ce_2O$ and/or $ZrO_2$. The phosphorus element or an oxide thereof contained in the catalyst layer according to the present invention may form a solid solution phase together with $Ce_2O$ and/or $ZrO_2$, or may form a single phase.

The rare earth element other than cerium element or an oxide thereof contained in the catalyst layer according to the present invention may form a complex oxide together with $Ce_2O$ and/or $ZrO_2$. The rare earth element other than cerium element or an oxide thereof contained in the catalyst layer according to the present invention may form a solid solution phase together with $Ce_2O$ and/or $ZrO_2$, or may form a single phase. The formation of a solid solution phase of the rare earth element other than cerium element or an oxide thereof together with $Ce_2O$ and/or $ZrO_2$ can be confirmed using an X-ray diffractometer (XRD) as described above.

The catalyst layer according to the present invention may contain one or two or more other metal elements. The other metal element(s) is/are contained in the catalyst layer according to the present invention, for example, in an oxide form. The other metal element(s) or an oxide(s) thereof may form a complex oxide together with $Ce_2O$ and/or $ZrO_2$. The other metal element(s) or an oxide(s) thereof may form a solid solution phase together with $Ce_2O$ and/or $ZrO_2$, or may form a single phase. The formation of a solid solution phase of the other metal element(s) or an oxide(s) thereof together with $Ce_2O$ and/or $ZrO_2$ can be confirmed using an X-ray diffractometer (XRD) as described above.

The one or two or more other metal elements can be selected from, for example, alkaline earth metal elements and transition metal elements. Examples of the alkaline earth metal elements include calcium (Ca) element, strontium (Sr) element, barium (Ba) element and radium (Ra) element. Examples of the transition metal elements include manganese (Mn) element, iron (Fe) element, cobalt (Co) element, nickel (Ni) element and copper (Cu) element.

Examples of the inorganic oxide other than the oxygen storage component include alumina, silica, silica-alumina, aluminosilicates, alumina-zirconia, alumina-chromia, alumina-ceria, and alumina-lanthana. Among these, alumina is preferable from the viewpoint of heat resistance.

The inorganic oxide other than the oxygen storage component may be modified with an oxygen storage component, or may support an oxygen storage component. For example, the inner surface of pores or the outer surface of alumina or the like may be modified with an oxygen storage component. The inner surface of pores or the outer surface of alumina or the like may support an oxygen storage component in a dispersed state.

The catalyst layer according to the present invention is composed of a single layer. The catalyst layer according to the present invention typically has a surface on a substrate side and a surface on a side opposite to the substrate side. One or both surface(s) of the catalyst layer according to the present invention may be provided with a catalyst layer(s) other than the catalyst layer according to the present invention. The other catalyst layer(s) has/have a composition(s) differing from that of the catalyst layer according to the present invention. It should be noted that when one or both surface(s) of the catalyst layer according to the present invention is/are provided with the other catalyst layer(s), the gas diffusion property may be decreased in the boundary between the catalyst layer according to the present invention and the other catalyst layer(s). When one or both surface(s) of the catalyst layer according to the present invention is/are provided with a catalyst layer(s) containing palladium element, the phosphorus element contained in the catalyst layer according to the present invention may transfer to the catalyst layer(s) containing palladium element, resulting in poisoning of the palladium element by the phosphorus. Therefore, it is preferable that any surface of the catalyst layer according to the present invention is not provided with the other catalyst layer.

In the exhaust gas purification catalyst according to the present invention, another catalyst layer other than the catalyst layer according to the present invention may be provided on a part of the substrate where the catalyst layer according to the present invention is not provided. The composition of the catalyst layer other than the catalyst layer according to the present invention can be adjusted in the same manner as the composition of a known catalyst layer. The catalyst layer other than the catalyst layer according to the present invention is, for example, a catalyst layer containing palladium element. When the catalyst layer other than the catalyst layer according to the present invention, e.g., a catalyst layer containing palladium element, is provided on a part of the substrate where the catalyst layer according to the present invention is not provided, the catalyst layer according to the present invention and the catalyst layer containing palladium element are separated from each other by the substrate. This can prevent poisoning of palladium element that may be caused by transfer of the phosphorus element contained in the catalyst layer according to the present invention to the catalyst layer containing palladium element.

The exhaust gas purification catalyst according to the present invention can be manufactured by applying a slurry for forming the catalyst layer according to the present invention on the substrate, followed by drying and calcining. The drying temperature is usually from 70° C. to 200° C., and preferably from 90° C. to 160° C., and the drying time is usually from 1 hour to 3 hours, and preferably from 1.5 hours to 2.5 hours. The calcining temperature is usually from 450° C. to 700° C., and preferably from 450° C. to 650° C., and the calcining time is usually from 1 hour to 4 hours, and preferably from 1.5 hours to 2.5 hours. For example, the calcining process can be performed in an air atmosphere.

The composition of the slurry for forming the catalyst layer according to the present invention is adjusted according to the composition of the catalyst layer according to the present invention. The slurry contains, for example, a source of rhodium element, a source of phosphorus element, a source of a rare earth element other than cerium element, inorganic oxide particles, a binder, a pore-forming agent and a solvent. Examples of the source of rhodium element include salts of rhodium element. Examples of the salts of rhodium element include nitrates, ammine complex salts and chlorides. Examples of the source of phosphorus element include phosphates. Examples of the phosphates include diammonium hydrogenphosphate, disodium hydrogenphosphate and calcium monohydrogen phosphate. Examples of the source of a rare earth element other than cerium element include salts of rare earth elements other than cerium element. Examples of the salts of rare earth elements other than cerium element include nitrates, sulfates and chloride. Examples of the inorganic oxide constituting the inorganic oxide particle include oxygen storage components and inorganic oxides other than oxygen storage components. Descriptions on oxygen storage components and inorganic oxides other than oxygen storage components are the same as described above. Examples of the binder include alumina sol, zirconia sol, titania sol and silica sol. Examples of the pore-forming agent include cross-linked polymethyl (meth) acrylate particles, cross-linked polybutyl (meth)acrylate particles, cross-linked polystyrene particles and cross-linked polyester acrylate particles. Examples of the solvent include water and organic solvents. Examples of the organic solvents include alcohols, acetone, dimethyl sulfoxide and dimethyl formamide. The solvent may be a single solvent or a mixture of two or more solvents. Examples of the mixture of two or more solvents include a mixture of water and one or two or more organic solvent(s) and a mixture of two or more organic solvents.

The median $D_{50}$ of the inorganic oxide particles is preferably from 1 µm to 15 µm, and more preferably from 3 µm to 10 µm, from the viewpoint of heat resistance. The median diameter $D_{50}$ is a particle size at which the cumulative volume reaches 50% in the particle size distribution by the volume standard, as measured by a laser diffraction/scattering particle size distribution analysis. The median diameter $D_{50}$ can be measured as described below. Briefly, the median diameter $D_{50}$ of inorganic oxide particles can be measured by feeding the inorganic oxide particles into an aqueous solvent using an automatic sample feeder for laser diffraction particle size distribution analyzers ("Microtorac SDC," manufactured by MicrotracBEL Corp.), irradiating them with 40 W ultrasound for 360 seconds at 40% flow rate, and measuring the median diameter $D_{50}$ using a laser diffraction/scattering particle size distribution analyzer ("Microtorac MT3300EXII," manufactured by MicrotracBEL Corp.). The median diameter $D_{50}$ is determined as the average value from two measurements with the measurement conditions adjusted into: particle refractive index of 1.5; spherical particle; solvent refractive index of 1.3; setzero for 30 seconds; and measurement time of 30 seconds. The aqueous solvent to be used is pure water.

The slurry for forming the catalyst layer according to the present invention may be prepared by mixing a source of rhodium element, a source of phosphorus element, a source of a rare earth element other than cerium element, inorganic oxide particles, and a solvent; drying and grinding the mixture to prepare a powder containing the inorganic oxide particles, and the rhodium element, the phosphorus element and the rare earth element other than cerium element that are supported on the inorganic oxide particles; and then mixing the obtained powder with, for example, a binder, a pore-forming agent and a solvent.

Figure 1:
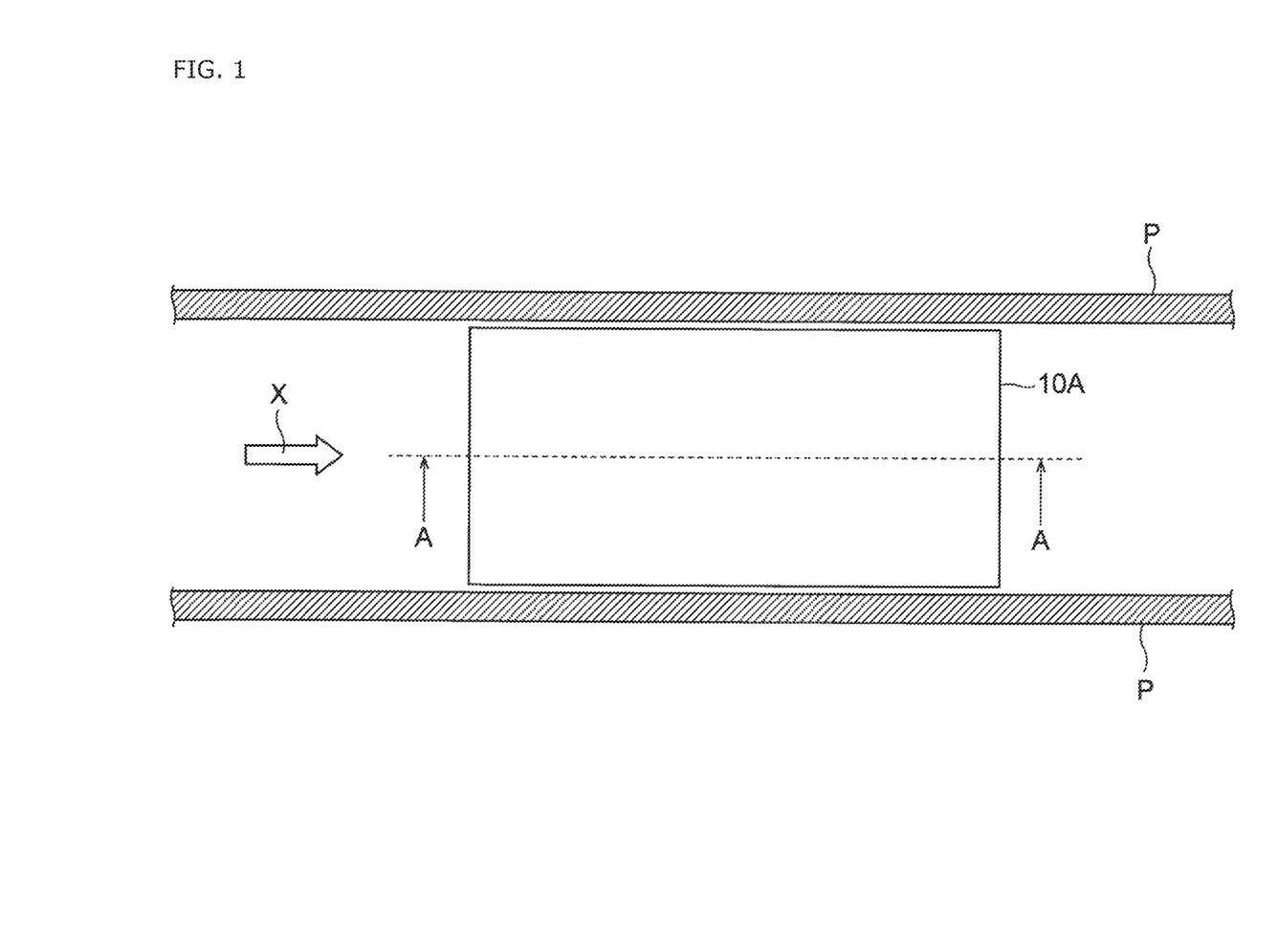
FIG. 1 is a partial cross-sectional view showing an exhaust gas purification catalyst according to a first embodiment of the present invention, wherein the exhaust gas purification catalyst is placed in an exhaust passage of an internal combustion engine.
Figure 2:
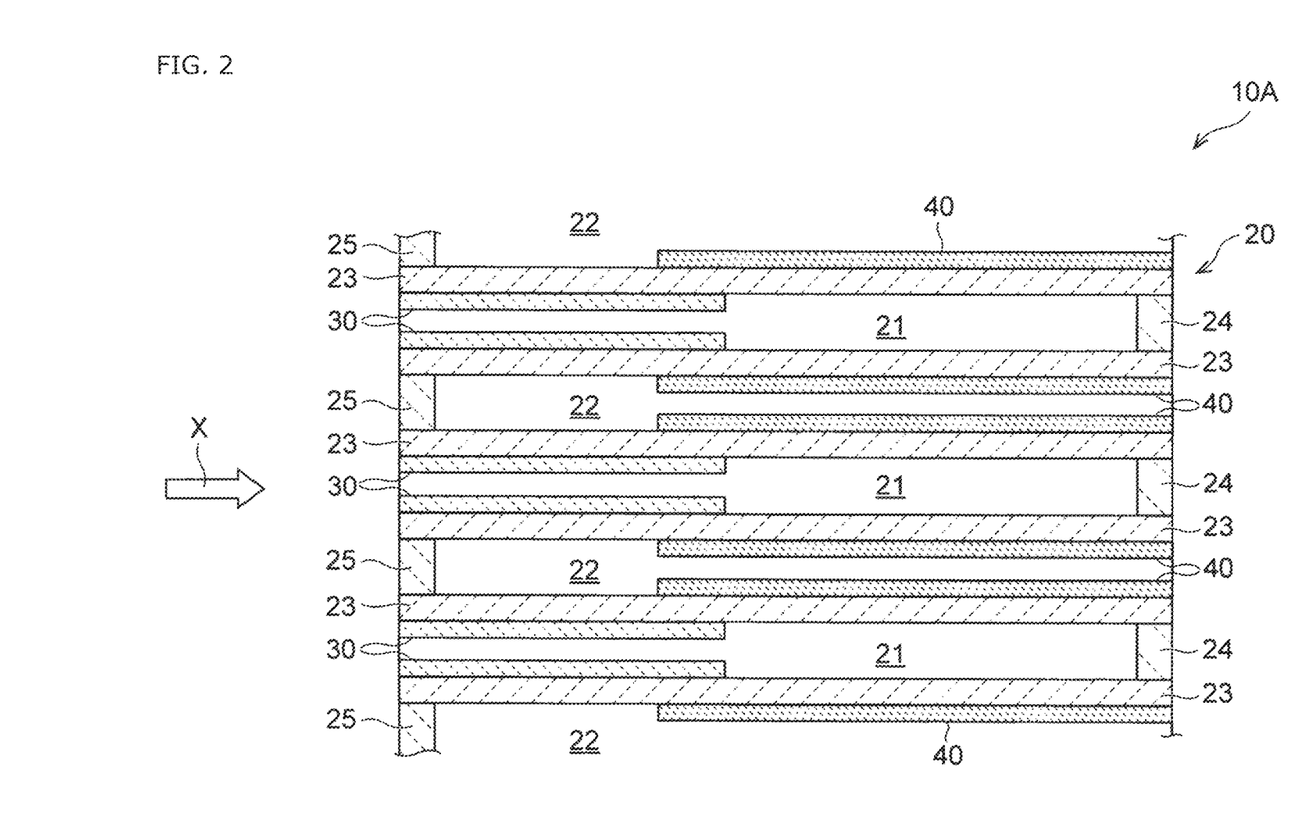
FIG. 2 is a cross sectional view along line A-A of FIG. 1.

With reference to FIGS. 1 and 2, an exhaust gas purification catalyst 10A according to a first embodiment of the present invention will be described below. FIG. 1 is a partial cross-sectional view showing the exhaust gas purification catalyst 10A according to the first embodiment of the present invention, wherein the exhaust gas purification catalyst 10A is placed in an exhaust passage of an internal combustion engine. FIG. 2 is a cross sectional view along line A-A of FIG. 1.

As shown in FIG. 1, the exhaust gas purification catalyst 10A according to the first embodiment of the present invention is placed in an exhaust passage P of an internal combustion engine, and used to purify exhaust gas discharged from the internal combustion engine. The exhaust gas purification catalyst 10A is placed, for example, in an exhaust passage of a gasoline engine (e.g., GDI engine), and used as a gasoline particulate filter (GPF). In the figures, the exhaust gas flow direction in the exhaust passage P of the internal combustion engine is represented by the symbol X. In the present specification, the upstream side of the exhaust gas flow direction X may be referred to as "the exhaust gas inflow side", and the downstream side of the exhaust gas flow direction X may be referred to as "the exhaust gas outflow side."

As shown in FIG. 2, the exhaust gas purification catalyst 10A includes a wall-flow substrate 20, a first catalyst layer 30 and a second catalyst layer 40.

In the exhaust gas purification catalyst 10A, one of the first catalyst layer 30 and the second catalyst layer 40 is the catalyst layer according to the present invention, or both of them are the catalyst layers according to the present invention. This enables the exhaust gas purification catalyst 10A to exhibit excellent exhaust gas purifying performance (in particular, excellent NOx purifying performance) at low to medium temperature.

When one of the first catalyst layer 30 and the second catalyst layer 40 in the exhaust gas purification catalyst 10A is a catalyst layer other than the catalyst layer according to the present invention, the composition of the catalyst layer other than the catalyst layer according to the present invention can be adjusted in the same manner as the composition of a known catalyst layer. The catalyst layer other than the catalyst layer according to the present invention is, for example, a catalyst layer containing palladium element. When one of the first catalyst layer 30 and the second catalyst layer 40 is the catalyst layer according to the present invention, while the other is a catalyst layer containing palladium element, the catalyst layer according to the present invention and the catalyst layer containing palladium element are separated from each other by a partition wall 23. This can prevent poisoning of palladium element that may be caused by transfer of the phosphorus element contained in the catalyst layer according to the present invention to the catalyst layer containing palladium element.

As shown in FIGS. 1 and 2, the exhaust gas purification catalyst 10A is placed in the exhaust passage P of the internal combustion engine such that the axis direction of the wall-flow substrate 20 is approximately coincident with the exhaust gas flow direction X. As used herein, the term "length" means a dimension in the axis direction of the wall-flow substrate 20 unless otherwise defined, and the term "thickness" means a dimension in a direction perpendicular to the axis direction of the wall-flow substrate 20 unless otherwise defined.

As shown in FIG. 2, the wall-flow substrate 20 includes an inflow-side cell 21, an outflow-side cell 22 and a porous partition wall 23 that separates the inflow-side cell 21 and the outflow-side cell 22 from each other. In the wall-flow substrate 20, a plurality of (e.g., four) outflow-side cells 22 are arranged around and adjacent to one inflow-side cell 21, and the inflow-side cell 21 and the outflow-side cells 22 adjacent to the inflow-side cell 21 are separated from one another by the porous partition wall 23. The wall-flow substrate 20 includes a tubular member (not shown) that defines the external shape of the wall-flow substrate 20. The partition wall 23 is formed inside the tubular member. The tubular member has, for example, a hollow cylindrical shape, but may have another shape. Examples of the other shape include a hollow elliptic cylindrical shape, a polygonal tubular shape and the like. The axis direction of the wall-flow substrate 20 is coincident with the axis direction of the tubular member.

As shown in FIG. 2, a recess having an open end on the exhaust gas inflow side and a recess having an open end on the exhaust gas outflow side are formed in the wall-flow substrate 20. The space inside the recess having an open end on the exhaust gas inflow side forms the inflow-side cell 21, while the space inside the recess having an open end on the exhaust gas outflow side forms the outflow-side cell 22.

As shown in FIG. 2, the inflow-side cell 21 extends in the exhaust gas flow direction X, and has an end on the exhaust gas inflow side and an end on the exhaust gas outflow side. As shown in FIG. 2, the end on the exhaust gas inflow side of the inflow-side cell 21 is open, while the end on the exhaust gas outflow side of the inflow-side cell 21 is closed. Hereinafter, the end on the exhaust gas inflow side of the inflow-side cell 21 may be referred to as "the opening of the inflow-side cell 21."

As shown in FIG. 2, the wall-flow substrate 20 is provided with a first sealing member 24 that seals the end on the exhaust gas outflow side of the inflow-side cell 21, whereby the end on the exhaust gas outflow side of the inflow-side cell 21 is closed by the first sealing member 24.

The shape of the opening of the inflow-side cell 21 in a plan view (the shape when the wall-flow substrate 20 is viewed in a plan view from the exhaust gas flow direction X) is, for example, square. The opening of the inflow-side cell 21 may have another shape in a plan view. Examples of the other shape include various geometric shapes, including: rectangles such as parallelograms, rectangles and trapezoids; polygons such as triangles, hexagons and octagons; and circles and ovals.

As shown in FIG. 2, the outflow-side cell 22 extends in the exhaust gas flow direction X, and has an end on the exhaust gas inflow side and an end on the exhaust gas outflow side. As shown in FIG. 2, the end on the exhaust gas inflow side of the outflow-side cell 22 is closed, while the end on the exhaust gas outflow side of the outflow-side cell 22 is open. Hereinafter, the end on the exhaust gas outflow side of the outflow-side cell 22 may be referred to as "the opening of the outflow-side cell 22."

As shown in FIG. 2, the wall-flow substrate 20 is provided with a second sealing member 25 that seals the end on the exhaust gas inflow side of the outflow-side cell 22, whereby the end on the exhaust gas inflow side of the outflow-side cell 22 is closed by the second sealing member 25.

The shape of the opening of the outflow-side cell 22 in a plan view (the shape when the wall-flow substrate 20 is viewed in a plan view in a direction opposite to the exhaust gas flow direction X) is, for example, square. The opening of the outflow-side cell 22 may have another shape in a plan view. Examples of the other shape include various geometric shapes, including: rectangles such as parallelograms, rectangles and trapezoids; polygons such as triangles, hexagons and octagons; and circles and ovals.

The area of the shape in a plan view of the opening of the inflow-side cell 21 may be the same as or different from the area of the shape in a plan view of the opening of the outflow-side cell 22.

The density of the cells in the wall-flow substrate 20 per square inch is, for example, from 200 cells to 400 cells. The cell density of the wall-flow substrate 20 per square inch means the total number of the inflow-side and outflow-side cells 21 and 22 per square inch in a cross section obtained by cutting the wall-flow substrate 20 by a plane perpendicular to the exhaust gas flow direction X.

The partition wall 23 has a porous structure through which exhaust gas can pass. The thickness of the partition wall 23 is, for example, from 150 μm to 500 μm. If the thickness of the partition wall 23 is not constant, the average value of the thicknesses obtained from a plurality of measurement points will be considered as the thickness of the partition wall 23.

As shown in FIG. 2, the first catalyst layer 30 is formed on the inflow-side cell 21 side of the partition wall 23 from the end on the exhaust gas inflow side of the partition wall 23 along the exhaust gas flow direction X.

The amount of the first catalyst layers 30 provided in the wall-flow substrate 20 can be appropriately adjusted in consideration of, for example, the balance between the exhaust gas purifying performance and the cost.

The first catalyst layer 30 has a part existing inside the partition wall 23. When the first catalyst layer 30 is formed, the part existing inside the partition wall 23 is formed, since the partition wall 23 is porous. The first catalyst layer 30 may have a part formed on the surface on the inflow-side cell 21 side of the partition wall 23, in addition to the part existing inside the partition wall 23. The phrase "the surface on the inflow-side cell 21 side of the partition wall 23" refers to the outer surface on the inflow-side cell 21 side of the partition wall 23, which defines the external shape of the partition wall 23. The phrase "a part formed on the surface on the inflow-side cell 21 side of the partition wall 23" refers to a part that rises from the outer surface on the inflow-side cell 21 side of the partition wall 23 toward the inflow-side cell 21. The existence region of the part formed on the surface on the inflow-side cell 21 side of the partition wall 23 does not overlap with the existence region of the partition wall 23, while the existence region of the part existing inside the partition wall 23 overlaps with the existence region of the partition wall 23. Therefore, the part formed on the surface on the inflow-side cell 21 side of the partition wall 23 and the part existing inside the partition wall 23 can be identified based on the compositions, forms, and the like obtained by cutting the first catalyst layer 30, and conducting analyses of the cross section, such as a composition analysis using fluorescent X-ray analysis, inductively coupled plasma atomic emission spectroscopy (ICP-AES) or the like, a cross-section observation using a scanning electron microscope (SEM), and the like. The thickness of the part formed on the surface on the inflow-side cell 21 side of the partition wall 23 can be appropriately adjusted. The thickness of the part formed on the surface on the inflow-side cell 21 side of the partition wall 23 is, for example, from 10 μm to 100 μm. If the thickness of the part formed on the surface on the inflow-side cell 21 side of the partition wall 23 is not constant, the average value of the thicknesses obtained from a plurality of measurement points will be considered as the thickness of the part formed on the surface on the inflow-side cell 21 side of the partition wall 23.

As shown in FIG. 2, the second catalyst layer 40 is formed on the outflow-side cell 22 side of the partition wall 23 from the end on the exhaust gas outflow side of the partition wall 23 along a direction opposite to the exhaust gas flow direction X.

The amount of the second catalyst layers 40 provided in the wall-flow substrate 20 can be appropriately adjusted in consideration of, for example, the balance between the exhaust gas purifying performance and the cost.

The second catalyst layer 40 has a part existing inside the partition wall 23. When the second catalyst layer 40 is formed, the part existing inside the partition wall 23 is formed, since the partition wall 23 is porous. The second catalyst layer 40 may have a part formed on the surface on the outflow-side cell 22 side of the partition wall 23, in addition to the part existing inside the partition wall 23. The phrase "the surface on the outflow-side cell 22 side of the partition wall 23" refers to the outer surface on the outflow-side cell 22 side of the partition wall 23, which defines the external shape of the partition wall 23. The phrase "a part formed on the surface on the outflow-side cell 22 side of the partition wall 23" refers to a part that rises from the outer surface on the outflow-side cell 22 side of the partition wall 23 toward the outflow-side cell 22. The existence region of the part formed on the surface on the outflow-side cell 22 side of the partition wall 23 does not overlap with the existence region of the partition wall 23, while the existence region of the part existing inside the partition wall 23 overlaps with the existence region of the partition wall 23. Therefore, the part formed on the surface on the outflow-side cell 22 side of the partition wall 23 and the part existing inside the partition wall 23 can be identified based on the compositions, forms, and the like obtained by cutting the second catalyst layer 40, and conducting analyses of the cross section, such as a composition analysis using fluorescent X-ray analysis, inductively coupled plasma atomic emission spectroscopy (ICP-AES) or the like, a cross-section observation using a scanning electron microscope (SEM), and the like. The thickness of the part formed on the surface on the outflow-side cell 22 side of the partition wall 23 can be appropriately adjusted. The thickness of the part formed on the surface on the outflow-side cell 22 side of the partition wall 23 is, for example, from 10 μm to 100 μm. If the thickness of the part formed on the surface on the outflow-side cell 22 side of the partition wall 23 is not constant, the average value of the thicknesses obtained from a plurality of measurement points will be considered as the thickness of the part formed on the surface on the outflow-side cell 22 side of the partition wall 23.

The exhaust gas purification catalyst 10A can be manufactured by applying a slurry for forming the first catalyst layer 30 and a slurry for forming the second catalyst layer 40 on the wall-flow substrate 20, followed by drying and calcining.

The composition of the slurry for forming the first catalyst layer 30 is adjusted according to the composition of the catalyst layer 30. The application of the slurry for forming the first catalyst layer 30 can be performed, for example, by immersing the end on the exhaust gas inflow side of the wall-flow substrate 20 in the slurry for forming the first catalyst layer 30, and aspirating the slurry from the other side.

The composition of the slurry for forming the second catalyst layer 40 is adjusted according to the composition of the second catalyst layer 40. The application of the slurry for forming the second catalyst layer 40 can be performed, for example, by immersing the end on the exhaust gas outflow side of the wall-flow substrate 20 in the slurry for forming the second catalyst layer 40, and aspirating the slurry from the other side.

Figure 3:
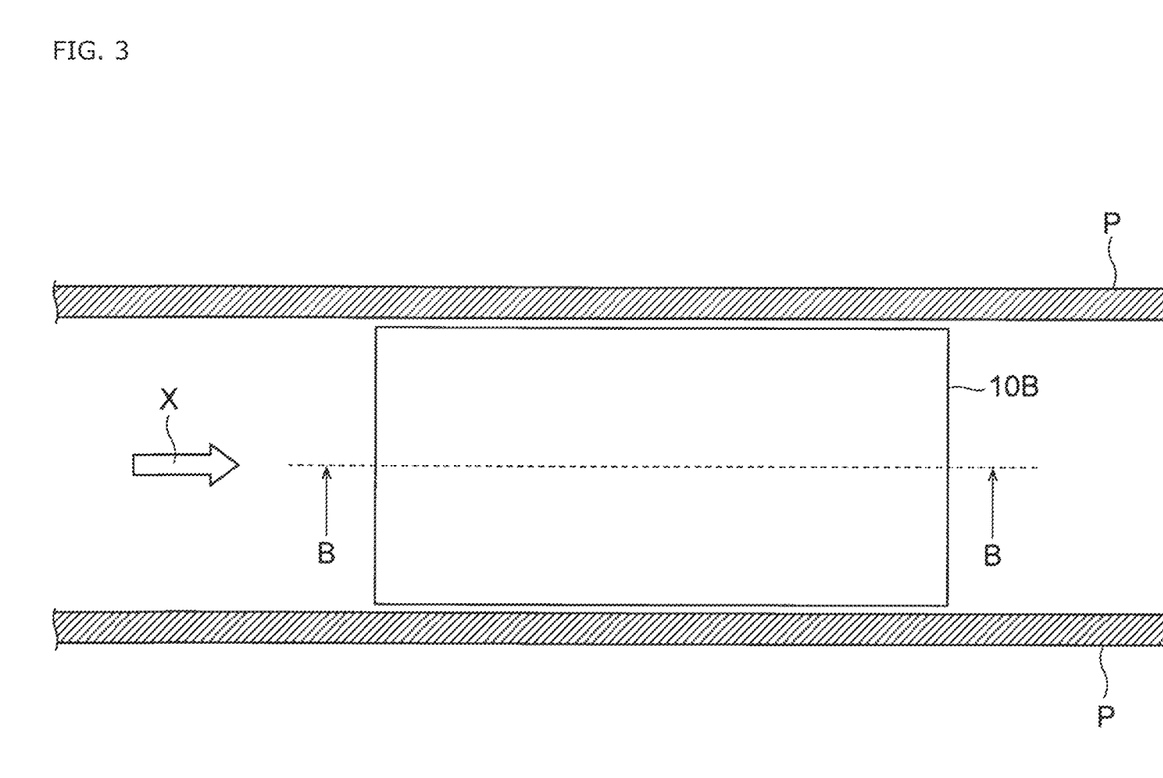
FIG. 3 is a partial cross-sectional view showing an exhaust gas purification catalyst according to a second embodiment of the present invention, wherein the exhaust gas purification catalyst is placed in an exhaust passage of an internal combustion engine.
Figure 4:
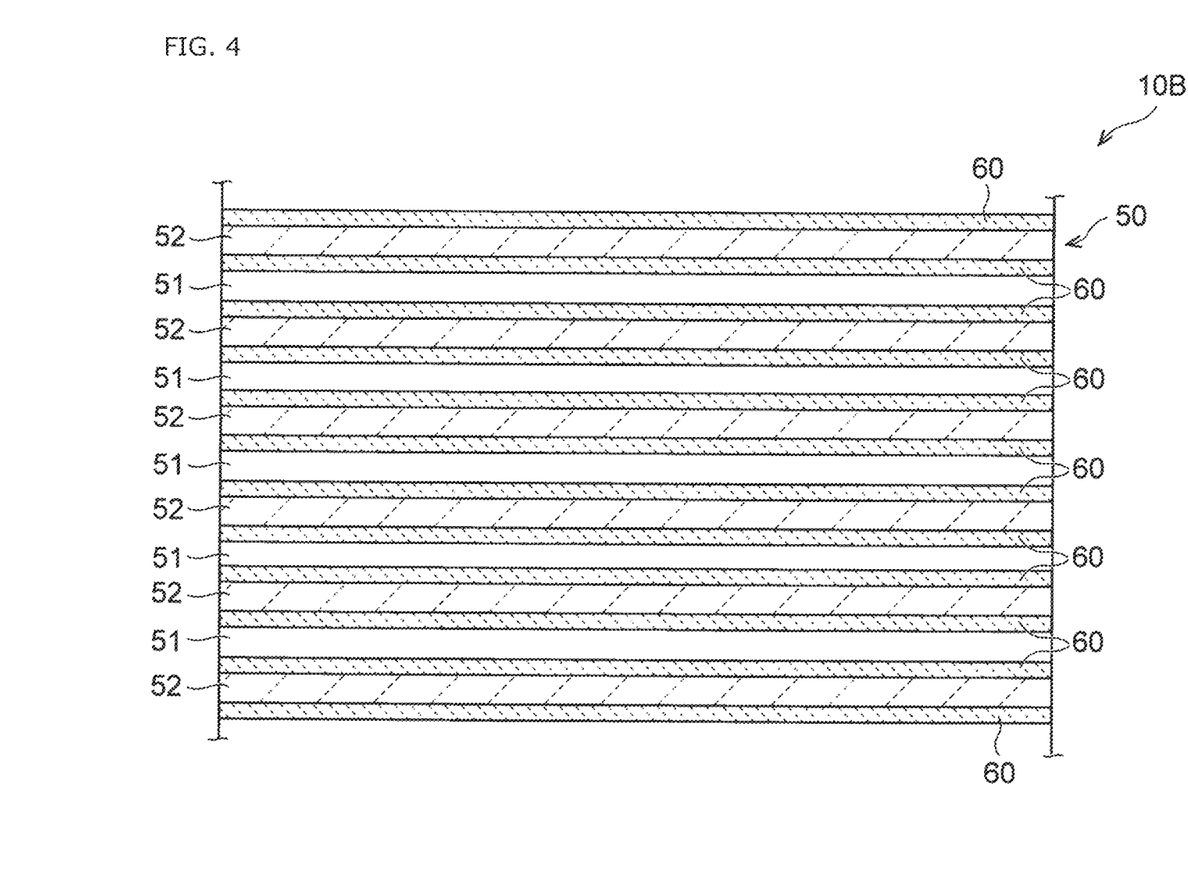
FIG. 4 is a cross sectional view along line B-B of FIG. 3.

With reference to FIGS. 3 and 4, an exhaust gas purification catalyst 10B according to a second embodiment of the present invention will be described below. FIG. 3 is a partial cross-sectional view showing the exhaust gas purification catalyst 10B according to the second embodiment of the present invention, wherein the exhaust gas purification catalyst 10B is placed in an exhaust passage of an internal combustion engine. FIG. 4 is a cross sectional view along line B-B of FIG. 2.

As shown in FIG. 3, the exhaust gas purification catalyst 10B according to the second embodiment of the present invention is placed in an exhaust passage P of an internal combustion engine, and used to purify exhaust gas discharged from the internal combustion engine. The exhaust gas purification catalyst 10B is placed, for example, in an exhaust passage of a gasoline engine (e.g., GDI engine). In the figures, the exhaust gas flow direction in the exhaust passage P of the internal combustion engine is represented by the symbol X. In the present specification, the upstream side of the exhaust gas flow direction X may be referred to as "the exhaust gas inflow side", and the downstream side of the exhaust gas flow direction X may be referred to as "the exhaust gas outflow side."

The exhaust gas purification catalyst 10B may be used in combination with the exhaust gas purification catalyst 10A. When the exhaust gas purification catalyst 10B is used in combination with the exhaust gas purification catalyst 10A, the exhaust gas purification catalysts 10A and 10B are placed in the exhaust passage P of the internal combustion engine. For example, the exhaust gas purification catalyst 10B is placed in the upstream of the exhaust passage P of the internal combustion engine, while the exhaust gas purification catalyst 10A is placed in the downstream of the exhaust passage P of the internal combustion engine.

As shown in FIG. 3, the exhaust gas purification catalyst 10B includes a flow-through substrate 50 and a catalyst layer 60.

In the exhaust gas purification catalyst 10B, the catalyst layer 60 is the catalyst layer according to the present invention. This enables the exhaust gas purification catalyst 10B to exhibit excellent exhaust gas purifying performance (in particular, excellent NOx purifying performance) at low to medium temperature. The exhaust gas purifying performance at low to medium temperature can be evaluated based on the light-off temperature T50. The light-off temperature T50 is a temperature at which the purification efficacy reaches 50%, and can be measured according to the conditions described in the Examples herein.

As shown in FIG. 3, the exhaust gas purification catalyst 10B is placed in the exhaust passage P of the internal combustion engine such that the axis direction of the flow-through substrate 50 is approximately coincident with the exhaust gas flow direction X. As used herein, the term "length" means a dimension in the axis direction of the flow-through substrate 50 unless otherwise defined, and the term "thickness" means a dimension in a direction perpendicular to the axis direction of the flow-through substrate 50 unless otherwise defined.

The flow-through substrate 50 is, for example, a honeycomb structure.

As shown in FIG. 4, the flow-through substrate 50 has a plurality of cells 51 and a partition wall 52 that separates the plurality of cells 51 from one another. In the flow-through substrate 50, the partition wall 52 is present between two adjacent cells 51, whereby the two adjacent cells 51 are separated from each other by the partition wall 52. The flow-through substrate 50 includes a tubular member (not shown) that defines the external shape of the flow-through substrate 50. The partition wall 52 is formed inside the tubular member. The tubular member has, for example, a hollow cylindrical shape, but may have another shape. Examples of the other shape include a hollow elliptic cylindrical shape, a polygonal tubular shape and the like. The axis direction of the flow-through substrate 50 is coincident with the axis direction of the tubular member.

As shown in FIG. 4, a plurality of voids each having an open end on the exhaust gas inflow side and an open end on the exhaust gas outflow side are formed in the flow-through substrate 50. The space inside each void forms each cell 51.

As shown in FIG. 4, a plurality of cells 51 each extend in the exhaust gas flow direction X, and each have an end on the exhaust gas inflow side in the exhaust gas flow direction X and an end on the exhaust gas outflow side in the exhaust gas flow direction X. As shown in FIG. 4, both ends on the exhaust gas inflow and outflow sides in the exhaust gas flow direction X are open. Hereinafter, the end on the exhaust gas inflow side of each cell 51 may be referred to as "the opening on the exhaust gas inflow side of each cell 51," while the end on the exhaust gas outflow side of each cell 51 may be referred to as "the opening on the exhaust gas outflow side of each cell 51."

The shape of the opening on the exhaust gas inflow side of each cell 51 in a plan view (the shape when the flow-through substrate 50 is viewed in a plan view from the exhaust gas flow direction X) include various geometric shapes, including: rectangles such as squares, parallelograms, rectangles and trapezoids; polygons such as triangles, hexagons and octagons; and circles and ovals.

The shape of the opening on the exhaust gas outflow side of each cell 51 in a plan view (the shape when the flow-through substrate 50 is viewed in a plan view from a direction opposite to the exhaust gas flow direction X) include various geometric shapes, including: rectangles such as squares, parallelograms, rectangles and trapezoids; polygons such as triangles, hexagons and octagons; and circles and ovals.

The area of the shape in a plan view of the opening on the exhaust gas inflow side of each cell 51 may be the same as or different from the area of the shape in a plan view of the opening on the exhaust gas outflow side of each cell 51.

The density of the cells in the flow-through substrate 50 per square inch is, for example, from 400 cells to 1200 cells. The cell density of the flow-through substrate 50 per square inch means the total number of the cells 51 per square inch in a cross section obtained by cutting the flow-through substrate 50 by a plane perpendicular to the exhaust gas flow direction X.

The thickness of the partition wall 52 is, for example, from 50 μm to 120 μm. If the thickness of the partition wall 52 is not constant, the average value of the thicknesses obtained from a plurality of measurement points will be considered as the thickness of the partition wall 52.

As shown in FIG. 4, the catalyst layer 60 may be formed on each side of the partition wall 52 from the end on the exhaust gas inflow side of the partition wall 52 to the end on the exhaust gas outflow side of the partition wall 52 along the exhaust gas flow direction X. Alternatively, the catalyst layer 60 may be formed on a part of the partition wall 52 from the end on the exhaust gas inflow side of the partition wall 52 along the exhaust gas flow direction X, and another catalyst layer may be formed from the catalyst layer 60 to the end on the exhaust gas outflow side of the partition wall 52 along the exhaust gas flow direction X. Alternatively, the catalyst layer 60 may be formed on a part of the partition wall 52 from the end on the exhaust gas outflow side of the partition wall 52 along a direction opposite to the exhaust gas flow direction X, and another catalyst layer may be formed from the catalyst layer 60 to the end on the exhaust gas inflow side of the partition wall 52 along the direction opposite to the exhaust gas flow direction X.

The amount of the catalyst layer 60 provided in the flow-through substrate 50 can be appropriately adjusted in consideration of, for example, the balance between the exhaust gas purifying performance and the cost.

The catalyst layer 60 may have a part existing inside the partition wall 52. When the catalyst layer 60 is formed, the part existing inside the partition wall 52 is formed, since the partition wall 52 is porous. The catalyst layer 60 may have a part formed on the surface of the partition wall 52, in addition to the part existing inside the partition wall 52. The phrase "the surface of the partition wall 52" refers to the outer surface of the partition wall 52, which defines the external shape of the partition wall 52. The phrase "a part formed on the surface of the partition wall 52" refers to a part that rises from the outer surface of the partition wall 52 toward the cell 51. The existence region of the part formed on the surface of the partition wall 52 does not overlap with the existence region of the partition wall 52, while the existence region of the part existing inside the partition wall 52 overlaps with the existence region of the partition wall 52. Therefore, the part formed on the surface of the partition wall 52 and the part existing inside the partition wall 52 can be identified based on the compositions, forms, and the like obtained by cutting the catalyst layer 60, and conducting analyses of the cross section, such as a composition analysis using fluorescent X-ray analysis, inductively coupled plasma atomic emission spectroscopy (ICP-AES) or the like, a cross-section observation using a scanning electron microscope (SEM), and the like. The thickness of the part formed on the surface of the partition wall 52 can be appropriately adjusted. If the thickness of the part formed on the surface of the partition wall 52 is not constant, the average value of the thicknesses obtained from a plurality of measurement points will be considered as the thickness of the part formed on the surface of the partition wall 52.

The exhaust gas purification catalyst 10B can be manufactured by applying a slurry for forming the catalyst layer 60 on the flow-through substrate 50, followed by drying and calcining.

The composition of the slurry for forming the catalyst layer 60 is adjusted according to the composition of the catalyst layer 60. The application of the slurry for forming the catalyst layer 60 can be performed, for example, by immersing the entire flow-through substrate 50 in the slurry for forming the catalyst layer 60, or by immersing the end on the exhaust gas inflow or outflow side of the flow-through substrate 50 in the slurry for forming the catalyst layer 60, and aspirating the slurry from the other side.

EXAMPLES

The embodiments of the present invention will be described in detail with reference to the Examples, but the present invention is not limited to the Examples.

Examples 1 to 7 and Comparative Examples 1 to 4

(1) Preparation of Noble Metal Supporting Powder

Rhodium nitrate and neodymium nitrate were dissolved in water to prepare a mixed aqueous solution of rhodium nitrate and neodymium nitrate. This mixed solution was heated to 50° C., to which a cerium-zirconium complex oxide powder ($CeO_2$: 40% by mass, $ZrO_2$: 60% by mass, specific surface area: 80 $m^2$/g, median diameter $D_{50}$: 7.6 μm) and an alumina powder (specific surface area: 100 $m^2$/g, median diameter $D_{50}$: 6.8 μm) were added to allow the cerium-zirconium complex oxide powder and the alumina powder to support rhodium element and neodymium element. Then, diammonium hydrogenphosphate was added to the resulting solution to further allow the powders to support phosphorus element. This solution was heated and evaporated to dryness, and then dried at 150° C. for 2 hours using a large hot air dryer. The obtained dried powder was grinded with an agate mortar, screened through a 150-mesh sieve, and then calcinated at 600° C. for 2 hours in an air atmosphere to prepare a noble-metal-supporting powder. The amount of each component in the noble-metal-supporting powder was adjusted so that the amount of each component in the catalyst layer after calcination would be the value shown in Table 1. In Table 1, the amount of each component in the catalyst layer after calcination is indicated as a mass of each component per unit volume of the wall-flow substrate (g/L).

(2) Preparation of Slurry for Forming Catalyst Layer

The noble-metal-supporting powder obtained in the above (1), a spherical pore-forming agent (cross-linked polymethyl (meth)acrylate particles), zirconia sol, and water as a liquid medium were mixed to prepare a slurry for forming the catalyst layer. The contents of the components in the slurry for forming the catalyst layer were adjusted to 16.7% by mass of the noble-metal-supporting powder, 1.8% by mass of the pore-forming material, 1.5% by mass of zirconia sol, and 80% by mass of water.

(3) Formation of Catalyst Layer

The substrate used was a wall-flow substrate. The wall-flow substrate used included a cell extending in the axis direction and divided by a partition wall having thickness of from 200 to 250 μm, at a density of 300 cells/inch$^2$ in a plane perpendicular to the axis direction, and had a volume of 1.4 L. The upstream end in the exhaust gas flow direction of the substrate was immersed in the slurry for forming the catalyst layer obtained in the above (2), followed by aspiration through the downstream end, and drying at 150° C. for 2 hours in an air atmosphere. This resulted in formation of a layer composed of the solid contents of the slurry on the surface on the inflow-side cell side of the partition wall. Thereafter, the substrate was calcinated at 600° C. for 2 hours in an air atmosphere. This gave an exhaust gas purification catalyst including the wall-flow substrate and the catalyst layer formed on the wall-flow substrate. The obtained catalyst layer was a single layer.

(4) Aging Treatment

The exhaust gas purification catalyst obtained in the above (3) was subjected to the following aging treatment. Specifically, the exhaust gas purification catalyst was placed in an exhaust gas passage, and subjected to aging treatment in which the exhaust gas purification catalyst was in contact with exhaust gas discharged from an engine that was operated under the following conditions, and the catalyst temperature was kept at the following temperature for the following period of time.

(Aging Treatment Conditions)

Engine for aging treatment: NA 2L gasoline engine for passenger vehicle

Gasoline used: commercially available regular gasoline

Aging treatment temperature: 930° C.

Aging treatment time: 80 hours

Change in air-fuel ratio in preceding stage of catalyst: a cycle of A/F=14.6(20 sec)→fuel cut off control (5 sec)→12.5(5 sec)

(5) Preparation of Evaluation Sample

The exhaust gas purification catalyst after the aging treatment was cut into a size of 25.4 mm diameter and 30 mm length to prepare a measurement sample.

(6) Evaluation of Light-off Temperature

A model gas having the following composition and A/F of 14.6 was passed through the measurement sample at 25 L/min while the CO and $O_2$ concentrations were adjusted so that the A/F value changes in the range from 14.4 to 14.8. While gradually raising the temperature of the gas flowing into the measurement sample from the normal temperature at 20° C./min, the amount of NOx contained in the exhaust gas that passed through the measurement sample was measured using a measurement apparatus (apparatus name: MOTOR EXHAUST GAS ANALYZER MEXA7100), from which the purification efficacy was calculated by the following equation. In the following equation, X represents the amount detected before catalyst installation, and Y represents the amount detected after catalyst installation.

Purification efficacy(%)=(X−Y)/X×100

(Composition of Model Gas (on a Volume Basis))

CO: 0.5%, $C_3H_6$: 1200 ppmC, NO: 500 ppm, $O_2$: 0.50%, $CO_2$: 14%, $H_2O$: 10%, $H_2$: 0.17%, $N_2$: balance The inlet gas temperature of the measurement sample when the NOx purification efficacy reached 50% was determined as the light-off temperature T50. The light-off temperature T50 was measured in the case of temperature rise. The results are shown in Table 1. The cases were evaluated as "S" where the light-off temperature T50 was lower than 286° C.; "A" where the light-off temperature T50 was 286° C. or higher and lower than 290° C.; "B" where the light-off temperature T50 was 290° C. or higher and lower than 300° C.; and "C" where the light-off temperature T50 was 300° C. or higher.

TABLE 1

| | Rh g/L | P g/L | $Nd_2O_3$ g/L | $Y_2O_3$ g/L | $Al_2O_3$ g/L | CeZrOx g/L | P/Rh | $Nd_2O_3$/Rh or $Y_2O_3$/Rh or $(Nd_2O_3 + Y_2O_3)$/Rh | $Nd_2O_3$/P or $Y_2O_3$/P or $(Nd_2O_3 + Y_2O_3)$/P | Light-off performance Evaluation | Temperature T50 (° C.) |
|---|---|---|---|---|---|---|---|---|---|---|---|
| Example 1 | 1.0 | 3.0 | 3.0 | — | 30 | 30 | 3.0 | 3.0 | 1.0 | A | 288 |
| Example 2 | 1.0 | 4.4 | 3.0 | — | 30 | 30 | 4.4 | 3.0 | 1.5 | S | 285 |
| Example 3 | 1.0 | 7.0 | 3.0 | — | 30 | 30 | 7.0 | 3.0 | 2.3 | A | 286 |
| Example 4 | 1.0 | 4.4 | 1.0 | — | 30 | 30 | 4.4 | 1.0 | 4.4 | B | 290 |
| Example 5 | 1.0 | 4.4 | 5.0 | — | 30 | 30 | 4.4 | 5.0 | 0.9 | B | 291 |
| Example 6 | 1.0 | 4.4 | — | 3.0 | 30 | 30 | 4.4 | 3.0 | 1.5 | B | 290 |
| Example 7 | 1.0 | 4.4 | 1.5 | 1.5 | 30 | 30 | 4.4 | 3.0 | 1.5 | A | 287 |
| Comparative Example 1 | 1.0 | 0.80 | 3.0 | — | 30 | 30 | 0.80 | 3.0 | 0.3 | C | 303 |
| Comparative Example 2 | 1.0 | 11 | 3.0 | — | 30 | 30 | 11 | 3.0 | 3.7 | C | 301 |
| Comparative Example 3 | 1.0 | 4.4 | 0.50 | — | 30 | 30 | 4.4 | 0.5 | 8.8 | C | 300 |
| Comparative Example 4 | 1.0 | 4.4 | 6.0 | — | 30 | 30 | 4.4 | 6.0 | 0.7 | C | 301 |

As shown in Table 1, the exhaust gas purification catalysts of Examples 1 to 7 satisfied (Condition 1) the ratio of the mass of phosphorus element contained in the catalyst layer to the mass of rhodium element contained in the catalyst layer (P/Rh) is from 1.0 to 10, and (Condition 2) the ratio of the mass of the rare earth element other than cerium element in terms of an oxide thereof contained in the catalyst layer to the mass of rhodium element contained in the catalyst layer is from 1.0 to 5.0, and the light-off temperatures T50 of the exhaust gas purification catalysts of Examples 1 to 7 were lower than 300° C. On the other hand, the exhaust gas purification catalysts of Comparative Examples 1 to 4 did not satisfy one or both of Conditions 1 and 2, and the light-off temperatures T50 of the exhaust gas purification catalysts of Comparative Examples 1 to 4 were 300° C. or higher. These results demonstrate that the exhaust gas purification catalysts of Examples 1 to 7 exhibited improved exhaust gas purifying performance (in particular, improved NOx purifying performance) at low to medium temperature as compared with the exhaust gas purifying performance (in particular, NOx purifying performance) at low to medium temperature of the exhaust gas purification catalysts of Comparative Examples 1 to 4.

DESCRIPTION OF SYMBOLS 10A, 10B exhaust gas purification catalyst
20 wall-flow substrate
21 inflow-side cell
22 outflow-side cell
23 partition wall
24 first sealing member
25 second sealing member
30 first catalyst layer
40 second catalyst layer
50 flow-through substrate
51 cell
52 partition wall
60 catalyst layer
X exhaust gas flow direction

The invention claimed is:

1. An exhaust gas purification catalyst, comprising:
a substrate; and
a catalyst layer formed on the substrate,
wherein the catalyst layer contains rhodium element, phosphorus element and a rare earth element other than cerium element,
wherein a ratio of a mass of the phosphorus element in terms of the phosphorus element contained in the catalyst layer to a mass of the rhodium element in terms of the rhodium element contained in the catalyst layer is from 1.0 to 10,
wherein a ratio of a mass of the rare earth element other than cerium element in terms of an oxide thereof contained in the catalyst layer to the mass of the rhodium element in terms of the rhodium element contained in the catalyst layer is from 1.0 to 5.0, and
wherein the catalyst layer does not contain any noble metal element other than the rhodium element.

2. The exhaust gas purification catalyst according to claim 1, wherein a ratio of the mass of the rare earth element other than cerium element in terms of an oxide thereof contained in the catalyst layer to the mass of the phosphorus element in terms of the phosphorus element contained in the catalyst layer is from 0.50 to 5.0.

3. The exhaust gas purification catalyst according to claim 1,
wherein the catalyst layer further contains inorganic oxide particles, and
wherein the rhodium element, the phosphorus element and the rare earth element other than cerium element are supported on the inorganic oxide particles.

4. The exhaust gas purification catalyst according to claim 1, wherein any surface of the catalyst layer is not provided with another catalyst layer.

5. The exhaust gas purification catalyst according to claim 1, wherein the substrate is a wall-flow substrate.

6. The exhaust gas purification catalyst according to claim 5,
wherein the wall-flow substrate comprises:
an inflow-side cell extending in an exhaust gas flow direction, wherein the inflow-side cell has an open end on an exhaust gas inflow side in the exhaust gas flow direction and a closed end on an exhaust gas outflow side in the exhaust gas flow direction;
an outflow-side cell extending in the exhaust gas flow direction, wherein the outflow-side cell has a closed end on an exhaust gas inflow side in the exhaust gas flow direction and an open end on an exhaust gas outflow side in the exhaust gas flow direction; and
a porous partition wall that separates the inflow-side cell and the outflow-side cell from each other, and
wherein the catalyst layer is formed on an inflow-side cell side or an outflow-side cell side of the partition wall.

7. The exhaust gas purification catalyst according to claim 1, wherein the mass of the rhodium element in terms of the rhodium element contained in the catalyst layer is from 0.10 g/L to 1.2 g/L based on an apparent volume of the substrate.

8. The exhaust gas purification catalyst according to claim 1, wherein the ratio of the mass of the phosphorus element in terms of the phosphorus element contained in the catalyst layer to the mass of the rhodium element in terms of the rhodium element contained in the catalyst layer is from 3.0 to 7.0.

* * * * *